US00RE47495E

(19) United States
(12) Reissued Patent
MacKenzie

(10) Patent Number: US RE47,495 E
(45) Date of Reissued Patent: Jul. 9, 2019

(54) RAIN SCREEN SIDING SYSTEM

(71) Applicant: Wood Siding Systems, LLC, Portland, OR (US)

(72) Inventor: Duncan MacKenzie, Lake Oswego, OR (US)

(73) Assignee: Wood Siding Systems, LLC, Portland, OR (US)

(21) Appl. No.: 15/677,863

(22) Filed: Aug. 15, 2017

Related U.S. Patent Documents

Reissue of:
(64) Patent No.: 9,109,368
Issued: Aug. 18, 2015
Appl. No.: 13/524,292
Filed: Jun. 15, 2012

U.S. Applications:
(60) Provisional application No. 61/497,244, filed on Jun. 15, 2011.

(51) Int. Cl.
*E04B 1/70* (2006.01)
*E04F 13/08* (2006.01)
*E04F 19/06* (2006.01)

(52) U.S. Cl.
CPC ..... *E04F 13/0803* (2013.01); *E04B 1/7076* (2013.01); *E04F 13/0814* (2013.01); *E04F 13/0846* (2013.01); *E04F 19/065* (2013.01); *E04F 19/064* (2013.01)

(58) Field of Classification Search
CPC ..... E04F 13/0803
USPC ..... 52/518, 520, 533, 539, 541, 543, 546, 52/553
See application file for complete search history.

(56) References Cited

U.S. PATENT DOCUMENTS

| | | | | | |
|---|---|---|---|---|---|
| 2,000,897 | A | * | 5/1935 | Alcott | E04B 1/34 256/19 |
| 2,659,323 | A | | 11/1953 | Alvarez, Jr. | |
| 3,015,193 | A | | 1/1962 | Amoruso | |
| 3,174,256 | A | | 3/1965 | Lockwood | |
| 3,237,360 | A | | 3/1966 | Mills | |
| 3,261,136 | A | | 7/1966 | Abner et al. | |
| 3,568,391 | A | * | 3/1971 | Conway | 52/364 |
| 4,506,486 | A | | 3/1985 | Culpepper, Jr. et al. | |
| 5,501,050 | A | | 3/1996 | Ruel | |
| 5,860,257 | A | * | 1/1999 | Gerhaher | E04F 13/0826 52/235 |

(Continued)

FOREIGN PATENT DOCUMENTS

| | | | |
|---|---|---|---|
| DE | 3401271 | A1 | 7/1985 |
| JP | 06158814 | A * | 6/1994 |

*Primary Examiner* — Russell D Stormer
(74) *Attorney, Agent, or Firm* — Chernoff, Vilhauer, McClung & Stenzel, LLP

(57) ABSTRACT

A rain-screen siding system for buildings, including clips to support siding boards parallel with a flat surface of a building wall structure but spaced apart from the building wall to allow air to circulate between the building wall structure and the siding boards. The clips include paired, opposed channels and the siding boards have tongues that fit into the channels. Drainage grooves are defined in the clips. Bottom support members may extend horizontally to support the siding boards at the bottom of the rain screen siding. Corner closing members are provided to protect end faces of siding boards at an exterior corner of a building wall.

25 Claims, 11 Drawing Sheets

(56) References Cited

U.S. PATENT DOCUMENTS

| | | | | |
|---|---|---|---|---|
| 6,055,787 | A * | 5/2000 | Gerhaher | E04F 13/0826 52/506.06 |
| 6,170,214 | B1 * | 1/2001 | Treister et al. | 52/511 |
| 6,195,952 | B1 | 3/2001 | Culpepper et al. | |
| 6,289,646 | B1 * | 9/2001 | Watanabe | E04F 13/0821 52/235 |
| 6,315,489 | B1 * | 11/2001 | Watanabe | 403/381 |
| 6,349,507 | B1 * | 2/2002 | Muellerleile | 52/36.5 |
| 6,598,362 | B2 | 7/2003 | Hikai | |
| 6,615,560 | B2 * | 9/2003 | Ito | 52/506.06 |
| 6,637,170 | B2 * | 10/2003 | Ito | 52/506.06 |
| 6,786,804 | B2 | 9/2004 | Watanabe | |
| 6,830,405 | B2 * | 12/2004 | Watanabe | 403/14 |
| D530,833 | S | 10/2006 | Robertson et al. | |
| 7,665,260 | B2 * | 2/2010 | Hikai | 52/235 |
| D617,011 | S | 6/2010 | Guffey | |
| 7,849,651 | B2 * | 12/2010 | Fujito et al. | 52/506.06 |
| 2002/0023398 | A1 * | 2/2002 | Ito | 52/220.1 |
| 2002/0046536 | A1 | 4/2002 | Hotta | |
| 2003/0014936 | A1 * | 1/2003 | Watanabe | E04F 13/0864 52/518 |
| 2004/0111993 | A1 | 6/2004 | Hollman | |
| 2006/0260247 | A1 * | 11/2006 | Monteer | E04F 13/0846 52/520 |
| 2006/0265988 | A1 * | 11/2006 | Fujito et al. | 52/511 |
| 2008/0216430 | A1 | 9/2008 | Gleeson et al. | |
| 2009/0249721 | A1 | 10/2009 | Cullen | |
| 2010/0132295 | A1 * | 6/2010 | Bootier | E04F 13/0841 52/520 |
| 2012/0117901 | A1 * | 5/2012 | Loyd | 52/235 |

* cited by examiner

RAIN SCREEN SIDING SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application claims the benefit of the filing date of U.S. Provisional Patent Application Ser. No. 61/497,244, filed Jun. 15, 2011.

BACKGROUND OF THE INVENTION

The present invention relates to rain screen siding systems including siding boards that may be of wood and devices for supporting the siding boards spaced apart from but parallel with plywood or other sheathing of a building wall structure.

Wooden siding, even when painted, is porous enough to absorb moisture from humid air, rain, or other precipitation, and to be dried by long exposure to dry hot air and direct sunlight, during different weather conditions or times of the year.

Particularly in wet climates, siding boards fastened closely to a wall structure such as plywood sheathing covered with a waterproof or water-resistant weather barrier membrane may be continuously damp on and adjacent their inner faces, even while the outer surfaces of the siding boards may become dry enough in hot, dry, weather to begin to shrink and cause the boards to cup. Over time, this may result in siding boards beginning to crack or rot or harbor ants or other insect pests.

In well-known rain screen siding arrangements furring strips are fastened on the outside of weather barrier membranes over plywood sheathing or other structural members on the outside of a building wall framework. Siding boards are fastened to the furring strips and are thus spaced outwardly apart from the weather barrier membranes, so that air can circulate between the siding boards and the weather barrier membrane, to help the inner faces of siding boards to shed moisture and thus avoid deterioration for a longer time. An air space between the siding boards and the underlayment membranes provides some thermal insulation in both hot and cold weather conditions. Siding boards, however, must be nailed or screwed directly to the furring strips.

Clips for supporting siding boards in a rain screen arrangement are known as shown in Hikai U.S. Pat. No. 6,598,362. The clips disclosed by Hikai are designed to support parallel siding boards that have overlapping edge portions, with the siding boards spaced apart from an underlying building wall surface such as an underlayment weather barrier membrane on a plywood sheathing, but with the edges of adjacent siding boards closely adjacent to one another, thus forming a substantially tight layer of siding boards albeit separated from the supporting building wall framework and its sheathing and underlayment membrane by an air space.

Guffey U.S. Pat. No. D617,011 discloses a design for a rain screen system in which a supporting clip extends around an upper edge of a lower siding board and into a groove in a lower edge of an upper siding board, supporting the adjacent upper and lower siding boards with a space defined between their edges. Guffey fails, however, to explain how the clips are to be attached to a building wall structure.

Hotta U.S. Patent Application Publication Document No. US 2002/0046536 A1 discloses another siding support member to support siding boards with overlapping, tightly adjacent edges, but with an air space between the assembled siding boards and an exterior surface of a supporting building wall framework and its underlayments.

What is needed, then, is a system for supporting a rain screen siding arrangement that is not limited to the previously known horizontal orientation of each siding board, and that provides a ventilated air space between siding boards and a supporting wall framework, sheathing, and underlayment membranes.

SUMMARY OF THE INVENTION

The present application discloses a rain screen siding system for mounting siding boards to a structure so that the siding boards are spaced apart from the exterior surface of a wall that may include sheathing boards covered by a weather barrier membrane. Clips may be fastened to the sheathing boards or supporting framework by screws, and siding boards that form a part of the system include tongues that fit into channels facing openly upward and downward from each clip, so that the siding boards are supported at their top and bottom margins by the clips with the siding boards spaced apart from each other far enough to permit ventilation between the siding boards, and the siding boards are spaced apart from the wall structure to which the clips are attached to create [an] *a continuous* air space providing thermal insulation as well as a path for drainage.

A bottom support member is provided to facilitate mounting siding boards oriented diagonally or vertically.

A corner supporting structure is provided to support the ends of siding boards where they meet each other at an exterior corner of a building, maintaining spacing between the siding boards and the interior structure of the building and protecting the ends of the siding boards against exposure to the elements. The corner support structure includes a corner cap that mates with a base portion of the corner support structure by engagement of barbs in one part with grooves defined in the mating part.

The foregoing and other features and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF THE DISCLOSED EMBODIMENTS

Figure 1:
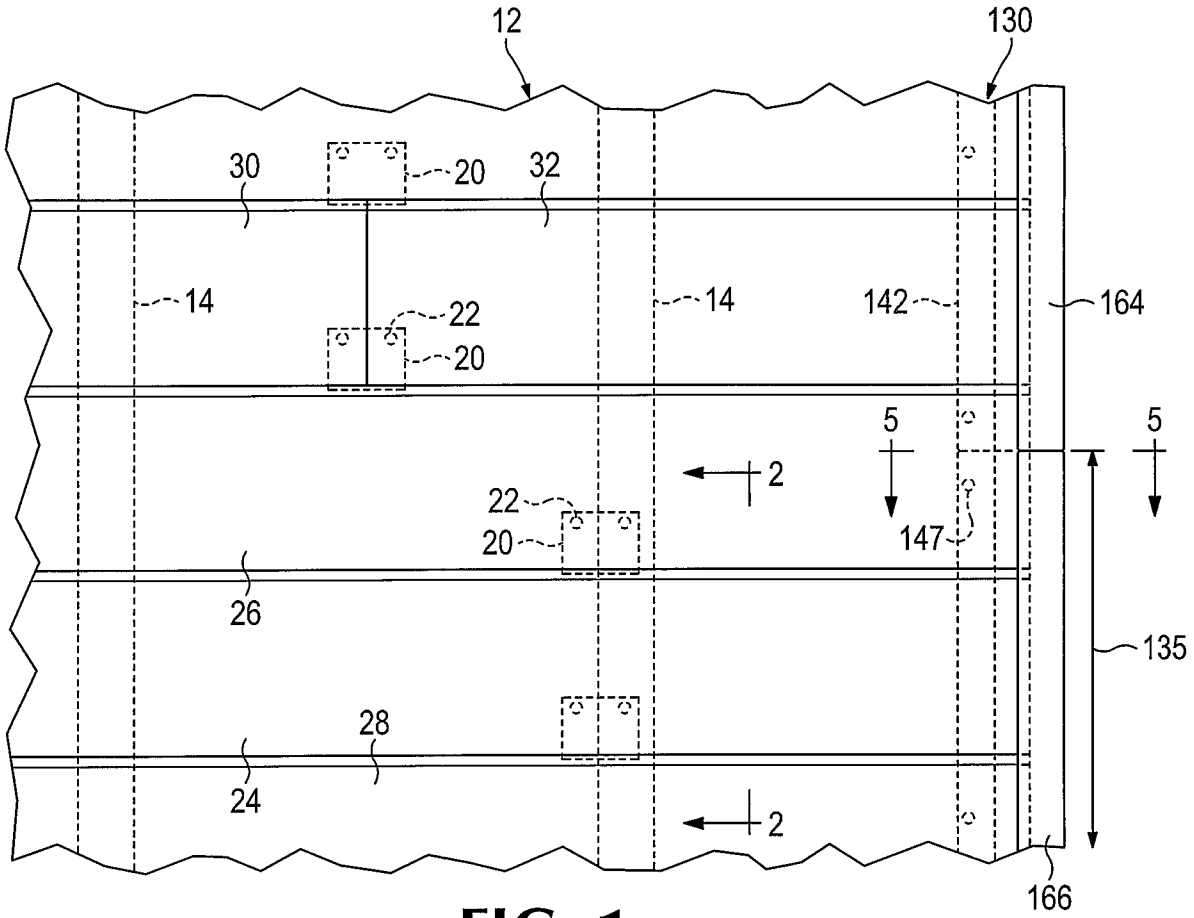
FIG. 1 is an elevational view of a portion of a wall of a building, to which a rain screen siding structure that is an embodiment of the present invention has been attached.

Referring next to the drawings which form a part of the disclosure herein, a rain screen siding arrangement 12 is shown as installed on a conventional frame building wall structure including structural frame members such as studs 14 supporting a layer 16 of sheathing material such as plywood sheets covered by a weather-barrier membrane 18 of a material such as roofing felt or a synthetic vapor barrier membrane attached to the sheathing layer 16 in a conventional manner. A plurality of siding-supporting clips 20 are fastened to the sheathing layer 16, by conventional fasteners such as screws 22, that may also be fastened through the sheathing layer 16 to a supporting stud 14 or other structural support member. Siding boards 24, 26, 28, 30, and 32 are supported and attached to the building wall structure by the clips 20.

In one embodiment, the clips 20 may be fashioned as an aluminum extrusion cut to desired lengths, and the screws 22 may be of stainless steel, in order to have ample strength yet resist rusting and electrolytic corrosion reactions with the aluminum material of a clip 20. For example, the clips 20 may be of extruded marine grade T6 aluminum alloy, and the screws 22 may be one inch long number 12 square drive, pan head wood screws. Longer screws may be used where a stud 14 or other structural member is located behind the sheathing layer 16 at the point of attachment of the clip 20.

At the right-hand side of FIG. 1, an exterior corner of the building has a corner extending vertically and the rain screen siding system 12 includes an attachment assembly for securing the ends of the siding boards to the wall structure along the vertically-extending corner where a wall parallel with the surface of the drawing meets a wall extending rearwardly back from the surface of the drawing.

Figure 2:
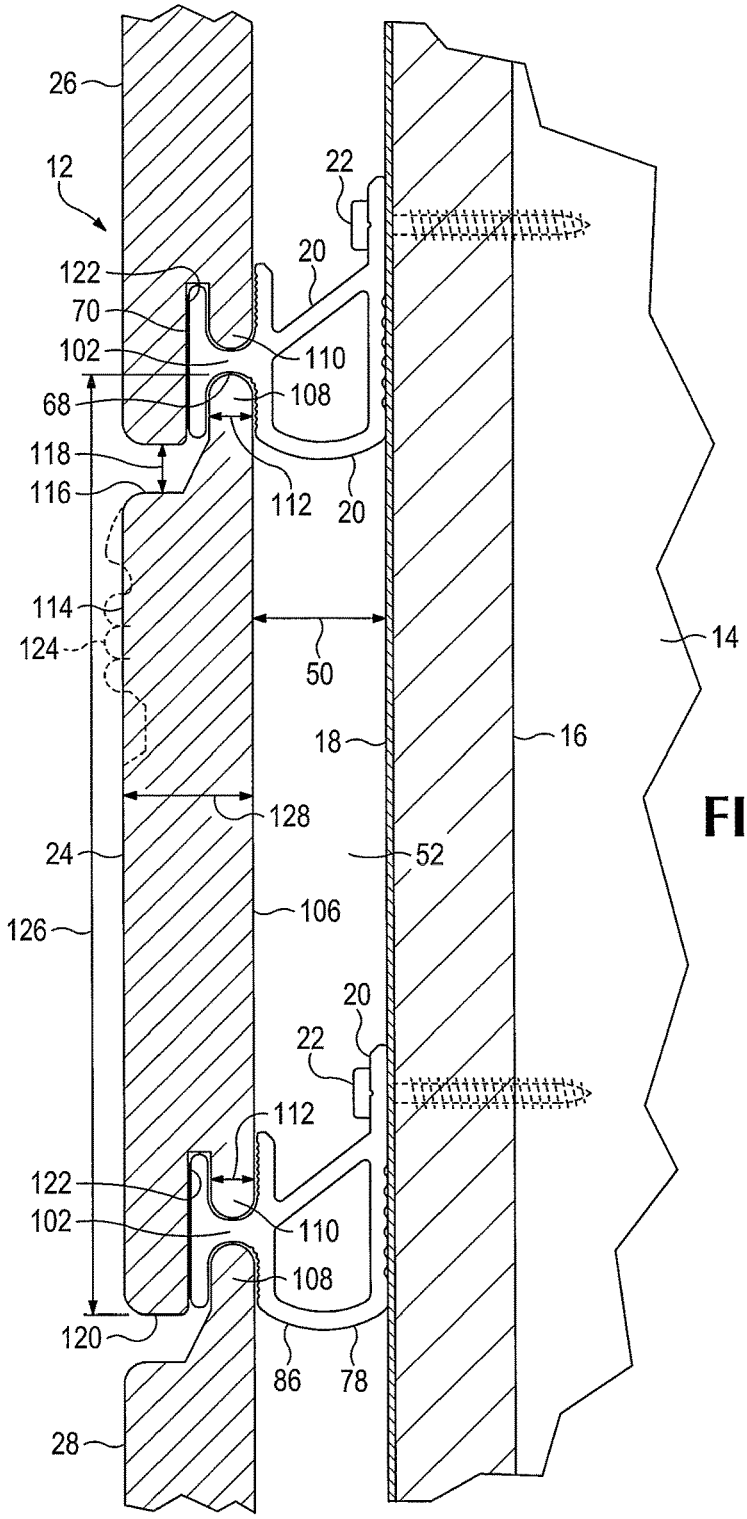
FIG. 2 is a sectional view of a portion of the wall structure of a building, taken along line 2-2 of FIG. 1, at an enlarged scale, showing siding boards attached to a framework of a building wall.
Figure 3:
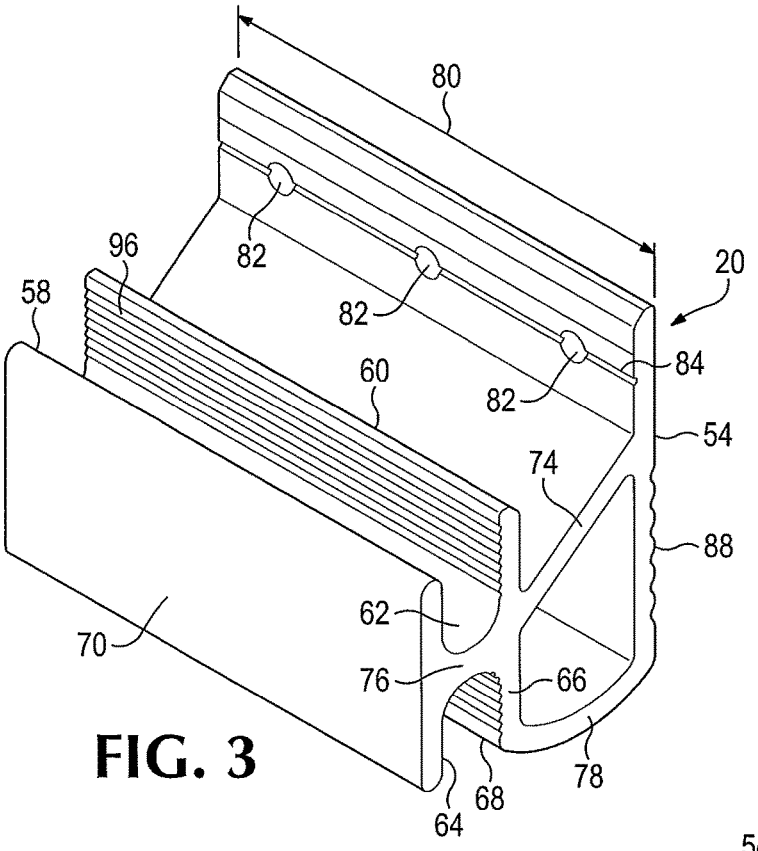
FIG. 3 is an isometric view of a mounting clip of the sort shown in FIGS. 1 and 2.
Figure 4:
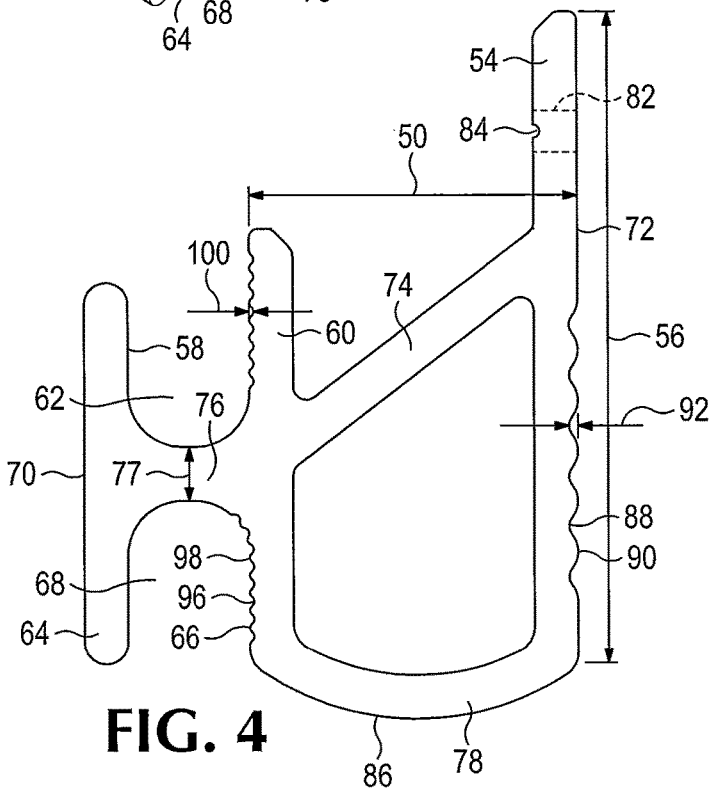
FIG. 4 is an end elevational view of the clip shown in FIG. 3, at an enlarged scale.

Referring now to FIGS. 2-4, the clips 20 support the siding boards 24, 26, 28, etc., spaced apart outwardly away from the weather barrier layer 18 of the wall structure, by a standoff distance 50 of, for example, 0.75 inch, that establishes [an] *a continuous* air space 52 between the siding boards 24, 26, 28, etc., and the wall structure. A *generally planar* mounting base 54 rests against the weather barrier 18, supported by the *generally flat* sheathing 16, and may have a height 56 of about 1.5 inches in one embodiment. A pair of channel walls, an outer channel wall *member* 58 and an inner channel wall *member* 60 define an upwardly open channel 62 in the clip 20. *As shown in FIGS. 2, 3 and 4, the inner channel wall member 60 may extend to a slightly greater height than does the outer channel wall member 64.* A depending lower outer channel wall *member* 64 and a lower inner channel wall *member* 66 define a downwardly open or lower channel 68 aligned with but facing oppositely from the upwardly open channel 62. Outward faces of the outer channel [walls] *wall members* 58 and 64 are coplanar and *cooperatively* define *an outer face in* a plane 70 parallel with the inner face 72 of the mounting base 54.

A standoff support structure includes an upper support member 74 that extends diagonally, obliquely, downward from the outer face of the mounting base 54 toward a central member 76 that has a thickness 77 and extends generally horizontally and separates the bottoms of the channels 62 and 68 from each other *while interconnecting the inner channel wall with the outer channel wall of each channel 62 and 68. The inner channel wall 60 thus extends upward above and beyond the upper support member 74, and the two members cooperatively define a space above the upper support member 74.* A generally horizontal curved support member 78, convex on what is normally a lower or bottom surface 86, interconnects a lower margin of the mounting base 54 with a lower margin of the inner channel wall 66 of the downwardly open channel 68. The two support members 74 and 78 thus establish a rigid trapezoidal structural interconnection between the mounting base 54 and the structures defining the upper and lower channels 62 and 68, so as to prevent them from twisting relative to the plane of the wall structure to which the mounting base 54 is attached.

As shown in FIG. 3, the clip 20 may have a length 80, of about 2 inches as measured parallel with the longitudinal dimensions of the siding boards 24, 26, etc., in one embodiment of the clip 20. At least one hole for receiving a fastener, such as a screw hole 82, and preferably at least a pair of screw holes 82 may be defined to extend through the mounting base 54 to receive a screw 22. In one version there may be three screw holes 82.

The screw holes 82 may be located, for example, located at least 0.25 inch inboard from each end of a clip 20, as with a center-to-center distance between two adjacent screw holes 82 of about 0.6825 inch, for example, although the distance is not critical, so long as there is ample material outboard of each screw hole 82 to satisfy requirements for strength of the clip 20.

A shallow groove 84 may be defined in the upper portion of the mounting base 54, extending between the screw holes 82 to promote drainage of moisture, particularly should the clips 20 be mounted in a non-horizontal orientation.

An inner or back side of the mounting base 54 may define several parallel grooves 88 separated by ridges 90, with the grooves 88 having a depth 92 of about 0.020 inch, for example, to promote drainage of liquids that may run or be condensed behind the clip 20 when it is mounted on a building structure. The grooves 88 may be spaced apart from one another by a distance of 0.116 inch, for example.

Similarly, smaller grooves 96 and ridges 98 may be defined in and extend along each of the inner channel walls 60 and 66, facing inwardly toward the interior of the channels 62 and 68, with a groove depth 100 of 0.010 inch, for example, to promote drainage of liquid drained into or condensed within the channels 62 and 68. Such drainage grooves 88 and 96 are desirable because the rain screen support arrangement of the siding boards 24, 26, 28, etc., results in open passageways or channels 102 between adjacent ones of the siding boards 24, 26, 28, etc.

As shown in FIGS. 1 and 2, each siding board 24, etc., has an inner face 106 that may be substantially planar, terminating along its upper margin in an upper tongue 108 extending *longitudinally along the siding board 24, etc., and* upwardly into the downwardly open lower channel 68 of the clip 20 immediately above the siding board 24, etc. Similarly, the inner face 106 may extend downwardly as a lower tongue 110 *extending longitudinally along the siding board 24, etc.* Each of the tongues 108 and 110 may have a width, or thickness 112 of, for example, 0.25 inch, slightly less than the interior width of each of the channels 62 and 68 whose interior width may be, for example, 0.281 inch, so that the tongues 108 and 110 fit comfortably, but not tightly, within the respective one of the channels 62 and 68, with some space available to accommodate some swelling or some misalignment between the clip 20 and the orientation of the siding board 24, 26, etc.

From the upper tongue 108 the siding board may be gradually increased in thickness toward its front or outer face 114, with a definite shoulder 116 extending rearwardly away from the outer face 114 toward the base of the upper tongue 108 to define an outer gap or channel 118 between adjacent siding boards, leading to the passageway 102, so that there is an unobstructed path between adjacent siding boards 24, 26, etc., through which a generous flow of air is possible to ventilate the air space 52 between the siding boards 24, 26, etc., and the weather barrier membrane 18. At the same time, the passageway 102 is only as wide as the thickness, for example about 0.125 inch, of the central member 76 between the channels 62 and 68, so the siding is not excessively open to wind or precipitation.

Along the bottom margin 119 of each siding board a skirt portion 120 overlaps the outer channel walls 58 and 64, extending along the outer planar surface 70 of the clip 20. A groove 122 is defined in the lower margin of each siding board 24, 26, etc., to receive the outer channel wall 58 of the upwardly open channel 62 of the respective clip 20, so that the skirt or overhang portion 120 can overlap the outer surface 70 of the outer channel walls, concealing the clips 20 supporting siding boards 24, 26, etc.

While the outer face 114 of the siding boards 24, 26 is shown herein as being flat, it will be understood that the siding boards might be manufactured to include various beads, channels, grooves, ribs, or other shapes that might be manufactured by use of appropriate cutters, as shown for example in broken line at 124.

Siding boards might be of various sizes, but may easily be manufactured to correspond with nominal 1×4, 1×6, or 1×8 inch lumber sizes. For example, the siding board 24 in a 1×6 inch size might have a width 126 of 5.375 inches between the extremities of the upper tongue 108 and the skirt 120, as shown in FIG. 2, and a thickness 128 of about 0.719 to 0.75 inch, for example.

Placement of clips 20 on the face of a building wall framework and sheathing is not critical, although it may be advantageous to have at least one of the screws 22 located so as to penetrate the sheathing 16 and also engage a stud 14 located behind the sheathing. In a normal horizontal orientation of the siding boards 24, 26, etc., only one of the screws 22 will be able to be driven into the narrow face of a stud 14, as shown in FIG. 1. While the clips 20 need not be located opposite one another on opposite top and bottom margins of a particular siding board as are the clips 20 on siding board 24 as shown in FIG. 1, it is important where the butt ends of a pair of siding boards such as the siding boards 30 and 32 meet each other to have a pair of clips 20 engage the ends of both the top and bottom margins of the abutting siding boards 30 and 32 to keep their ends aligned with each other, not only for the sake of appearance but also to avoid exposure of the end grain of either of the siding boards 30 and 32 to weather conditions that might accelerate checking and other deterioration of the wood. Spacing of clips 20 along a siding board may be, for example, 24 inches center to center.

Figure 5:
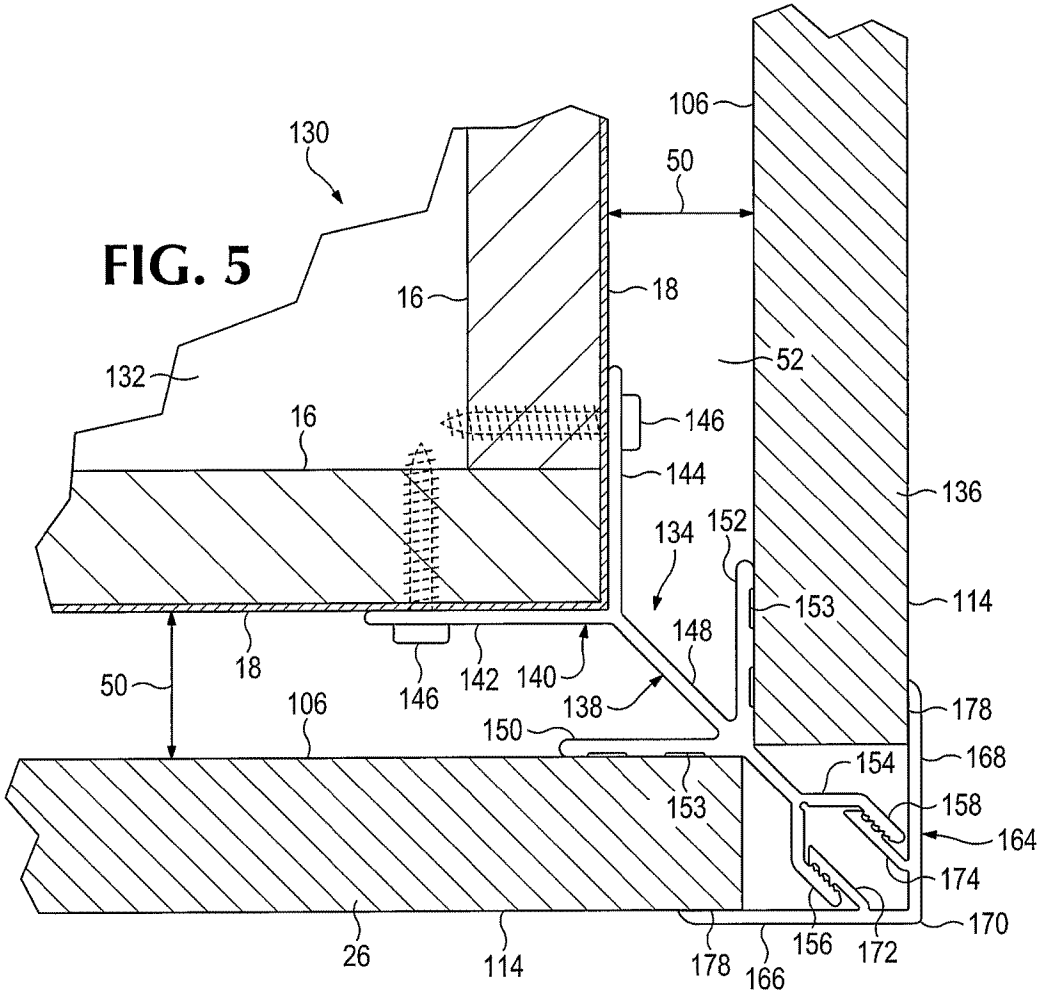
FIG. 5 is a sectional view of a portion of a wall structure including an exterior corner and a rain screen siding structure according to the disclosure herein attached to the building wall at that corner, taken along line 5-5 of FIG. 1.
Figure 6:
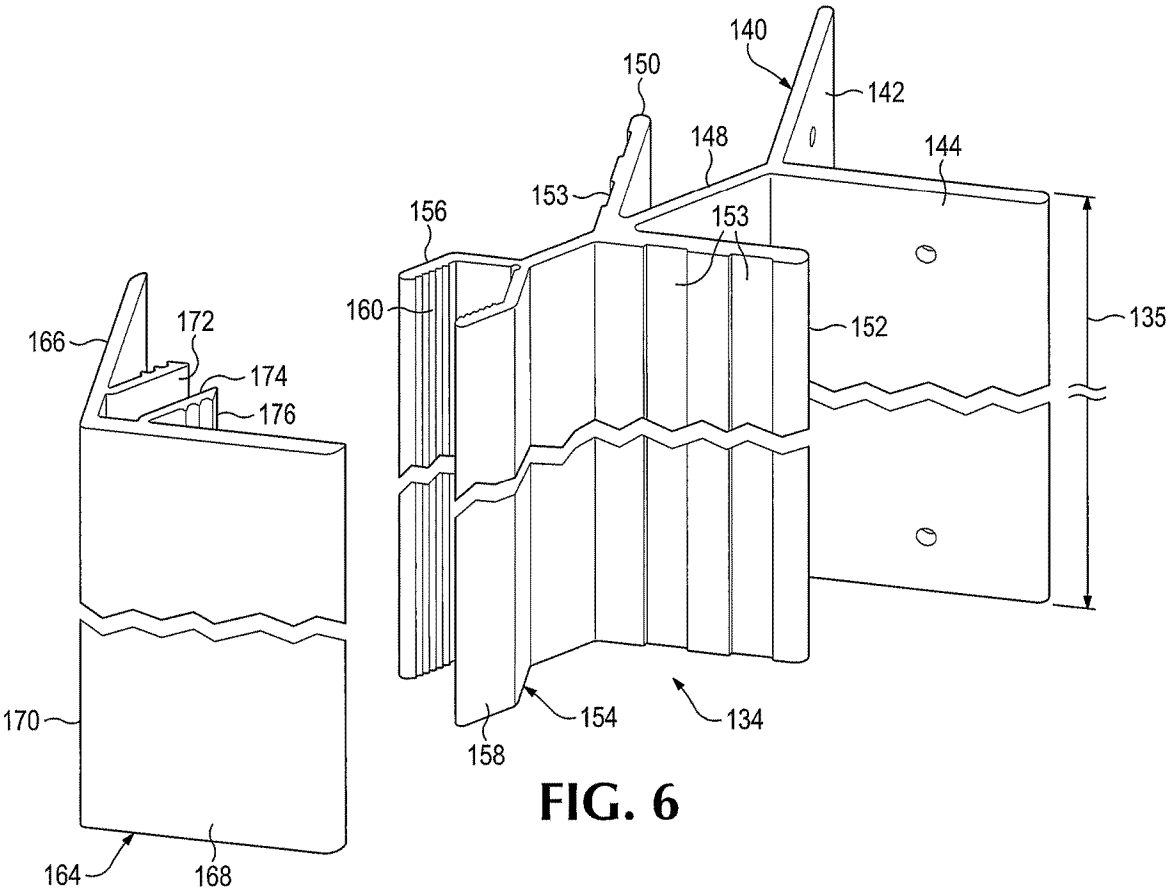
FIG. 6 is an isometric view of the two-part corner attachment assembly for securing siding boards shown in FIGS. 1 and 5, at an enlarged scale.
Figure 7:
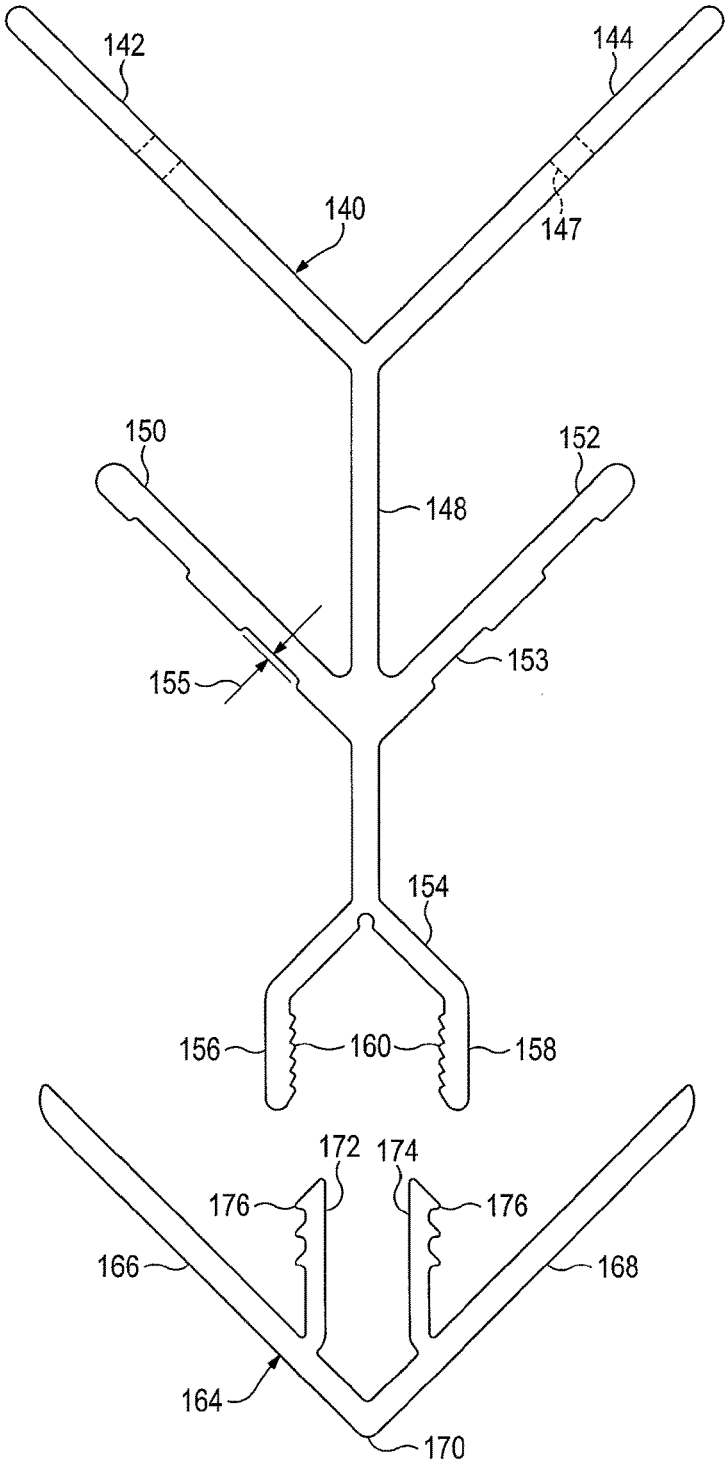
FIG. 7 is an end view of the two parts of the corner attachment assembly for securing siding boards shown in FIG. 1, at an enlarged scale.

Referring next to FIGS. 5, 6, and 7, where a structure has an exterior corner as at 130 in FIG. 1 a corner post 132 may have a layer 16 of sheathing extending past the corner post 132 by a distance equal to the thickness of another layer of sheathing 16 on the adjacent side of the corner post 132 at right angles to the first sheet of sheathing 16, with a weather barrier membrane 18 extending around the corner outside the sheathing 16. As shown in plan view in FIG. 5, the corner assembly includes a mounting member having a base portion 138 attached to the exterior of the exterior angle defined by intersecting sheathing boards attached to a corner post structure of the building framework. A corner cap 164 is attached to the base portion as will be described in greater detail presently and covers and secures the ends of the several siding boards that extend to the corner of the building wall structure depicted, so as to retain the end of each siding board and also to protect it against exposure to sun, wind, and precipitation. While the end grain of siding boards may be sealed by primer or sealant, the cap alone is sufficient to provide a significant amount of protection against weathering, checking, and splitting of the siding boards at their cut-off ends.

In particular, to support and maintain the proper location of a rain screen structure 12 a corner attachment assembly 134 may be used to secure and maintain the location of siding boards 24, 26, and 32 on a first side of the corner 130 with respect to siding boards including a siding board 136 extending to the corner 130 from the adjacent side.

The corner attachment assembly 134 includes a base portion 138 incorporating an angle section 140 including a pair of planar legs 142 and 144 fitted against the corner portion 130 and secured by screws 146 that may be of the same sort as the screws 22 used to attach the clips 20, fitted in holes 147 in the legs 142 and 144. The screws 146 may extend through the sheathing boards 16 and 18 and into the corner post 132 as shown in FIG. 5 to securely attach the base portion 138 to the corner 130. A spacer structure includes a diagonally oriented member 148 extending away from the angle section 140 at an angle of 135 degrees with respect to each of the legs 142 and 144. A pair of siding support flanges 150 and 152 extend from the diagonal member 148 parallel with the legs 142 and 144, respectively, of the angle portion 140, so as to support an inner face 106 of each of the siding boards 26, etc., and 136 at the standoff distance 50 established by the clips 20 securing the siding boards to the building structure as described above. It will be understood that instead of the diagonal member 148 a separate member might extend outwardly away from the angle section 140 to each of the siding support flanges 152. Extending diagonally outward from the corner 130 beyond the line of intersection of the siding support flanges 150 and 152 is a cap retainer portion 154. As shown best in FIGS. 6 and 7, the cap retainer portion 154 is configured as a "Y" with a pair of parallel arms 156 and 158. The interior surface of each arm 156 and 158 includes a group of parallel ridges defining parallel grooves 160 facing toward each other.

The base portion 138, as the clip 20, may be formed as an extrusion of aluminum or other suitably strong and durable material.

A corner cap 164 includes a pair of side members 166 and 168 that intersect and are joined with each other along a corner edge 170 that, when the cap 164 is in place, extends parallel with the building structure corner 130 to which the base portion 138 is attached. A pair of corner cap engagement legs 172, 174 both have several outwardly facing ridges 176 extending along their length parallel with a length 135 of the corner attachment assembly 134. The engagement legs 172 and 174 are appropriately spaced apart from one another and both the legs 172 and 174, and the arms 156 and 158 may be sufficiently resilient to allow the corner cap 164 to be pushed into engagement with the cap retainer portion 154 so that the ridges 176 can engage themselves in the grooves 160 to keep the corner cap 164 fastened to the cap retainer portion 154 of the base portion 138 after the siding boards have been installed.

Each of the siding support flange members 150 and 152 may define one or more shallow grooves 153 extending along its length and thus extending generally vertically along a building corner 130 where the rain screen siding system has been installed, as a channel for drainage of rain or condensation along the siding support flanges 150 and 152. The grooves 153 may have a depth 155 of 0.020 inch, for example.

The locations of the grooves 160 and ridges 176 permit the corner cap 164 to be engaged with the cap retainer portion 154 between the arms 156 and 158 to a depth great enough to permit the side members 166 and 168 to rest against the outer face 114 of each of the siding boards 26 and 136, etc., to keep the siding boards snugly in place supported by the siding support flanges 150 and 152. Each of the side members 166 and 168 will overlap an end portion 178 of a siding board 24, 136, etc., by an ample distance, such as 0.25-0.4 inch, when the end of a siding board is properly located adjacent the inner end of the cap retainer portion 154 as shown in FIG. 5. With the cap 164 in place, the end grain of each of the siding boards 26, 136, etc., is shielded from exposure to the sun and precipitation, which should prolong the duration of the siding board before the end grain begins to check and split. While such protection is advantageous, siding board life could be further extended by application of an appropriate sealant or primer paint to the exposed end grain wood surface.

Figure 8:
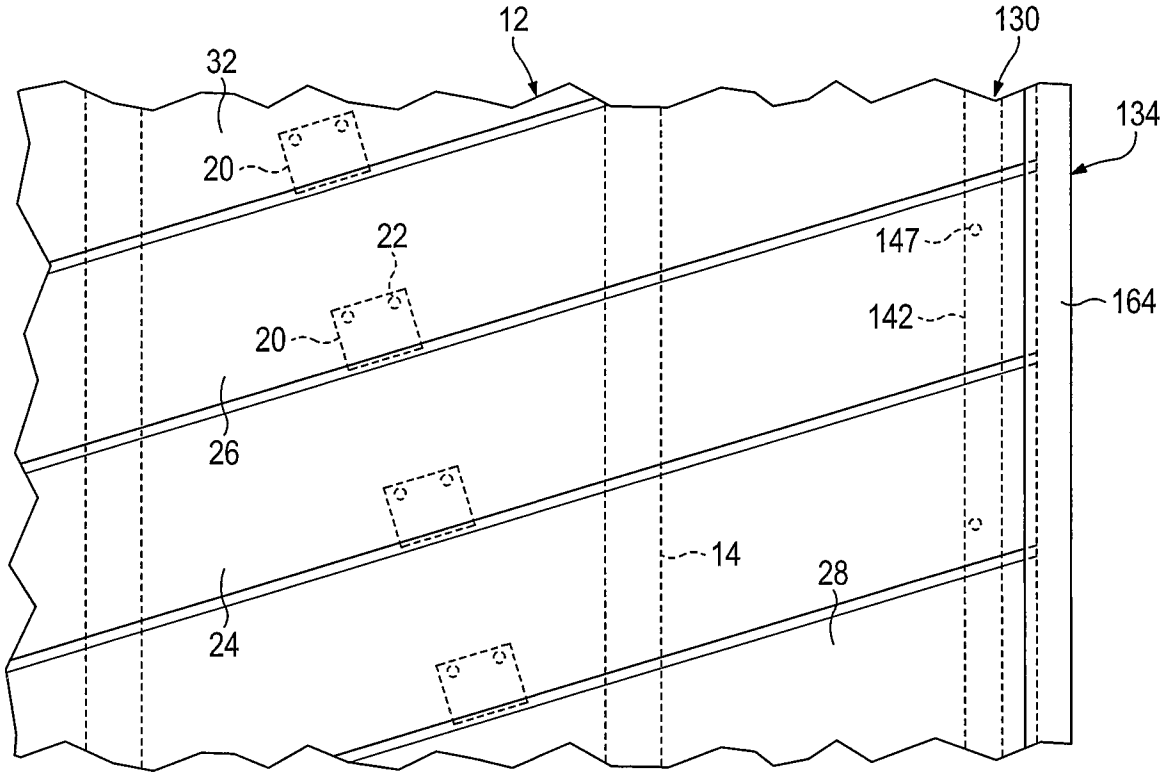
FIG. 8 is a view similar to that of FIG. 1, but showing a rain screen siding system with siding boards inclined at an oblique angle.
Figure 13:
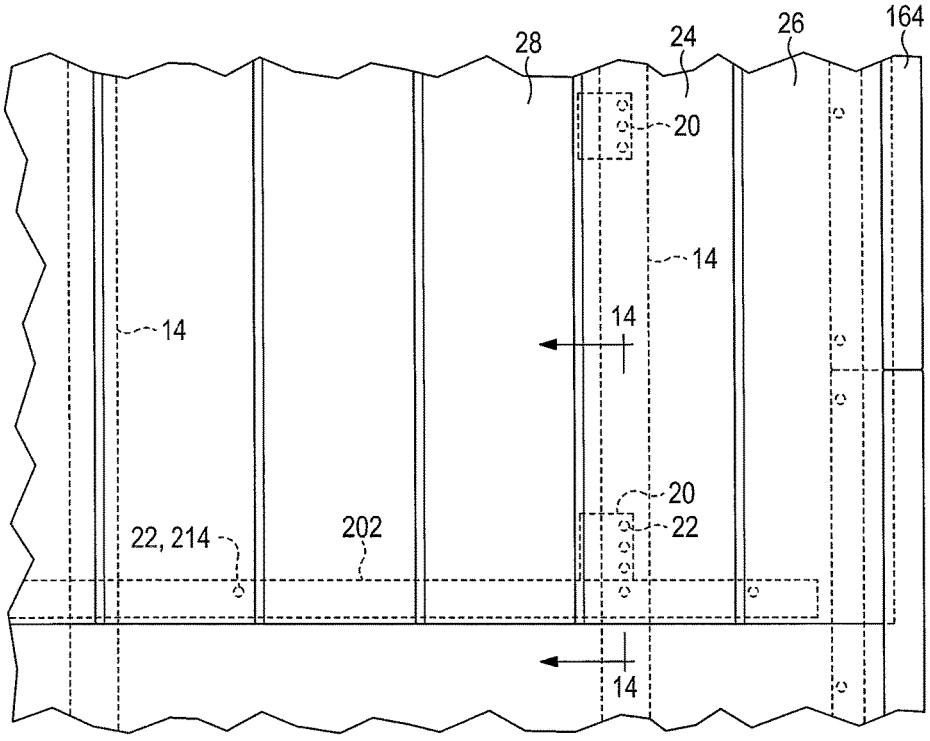
FIG. 13 is an elevational view of a portion of a wall of a building to which rainscreen siding has been attached with the lengths of siding bards oriented vertically.
Figure 14:
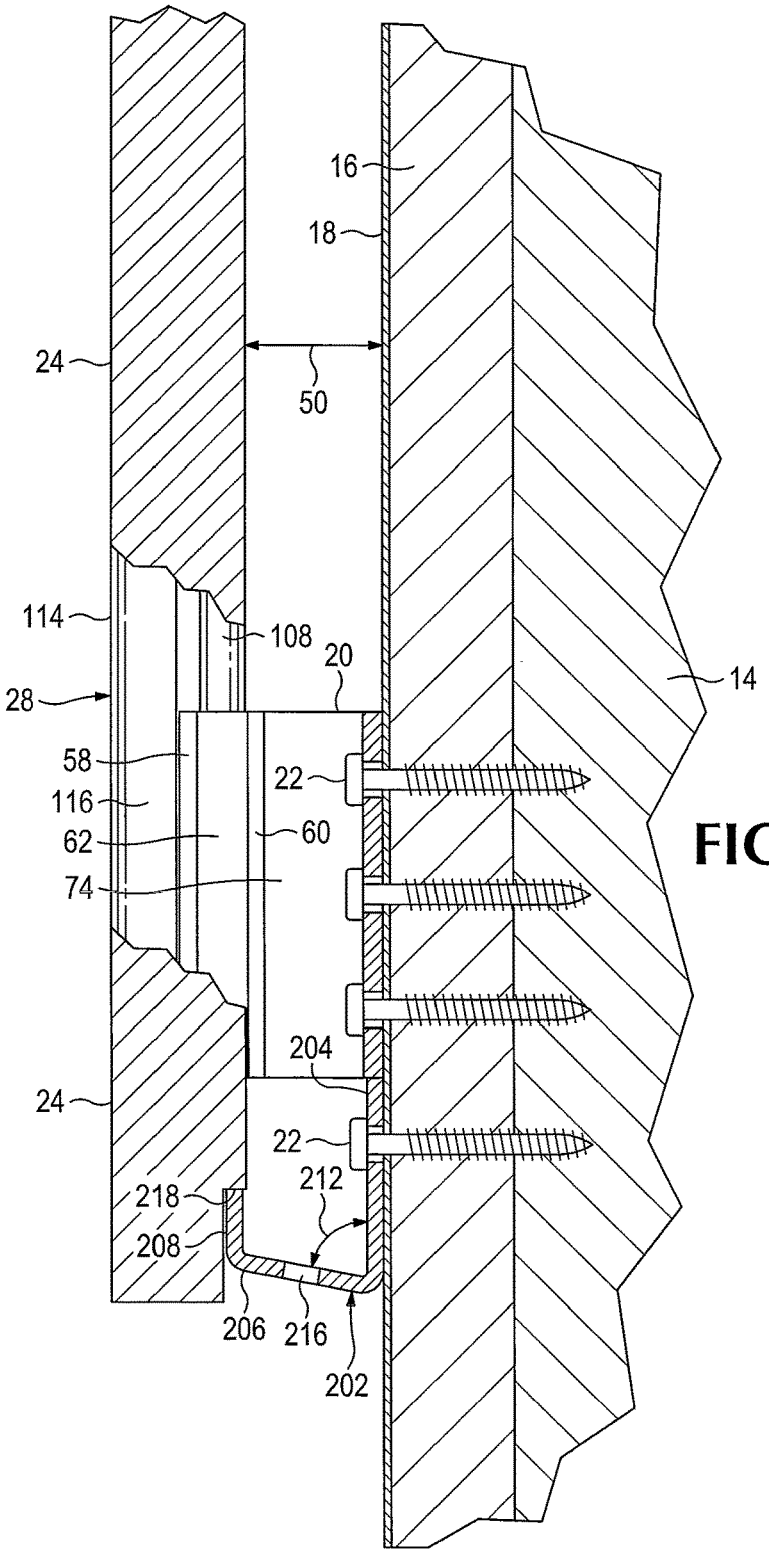
FIG. 14 is a partially cutaway sectional view taken along line 14-14 of FIG. 13.

While foregoing discussion has dealt with provision of a rain screen siding system as if the siding boards are mounted and supported in a conventional horizontal orientation of the length of each siding board, the clips 20 and corner attachment assemblies 134 permit siding boards also to be installed in a non-horizontal, obliquely sloped orientation as shown in FIG. 8, or even in a vertical orientation as shown in FIGS. 13 and 14 and described below. Support for each siding board 24, 26, etc., is provided by use of the clips 20 and the corner attachment assembly 134 so that an ample air space 52 is provided by the standoff distance 50 and ventilation is enhanced by the passageways 102 and the gaps 118 between opposed upper and lower margins of adjacent siding boards, as may be seen most clearly in FIG. 2. The ability to attach and support siding boards using the clips 20 disclosed herein may be particularly important in vertical orientation of the siding boards, since horizontal furring strips would obstruct drainage and ventilation, requiring some other structure such as furring strips to support the horizontal furring strips.

Screens may be installed at the top and bottom of each panel of siding boards to exclude birds and small animals without preventing air flow.

Figure 9:
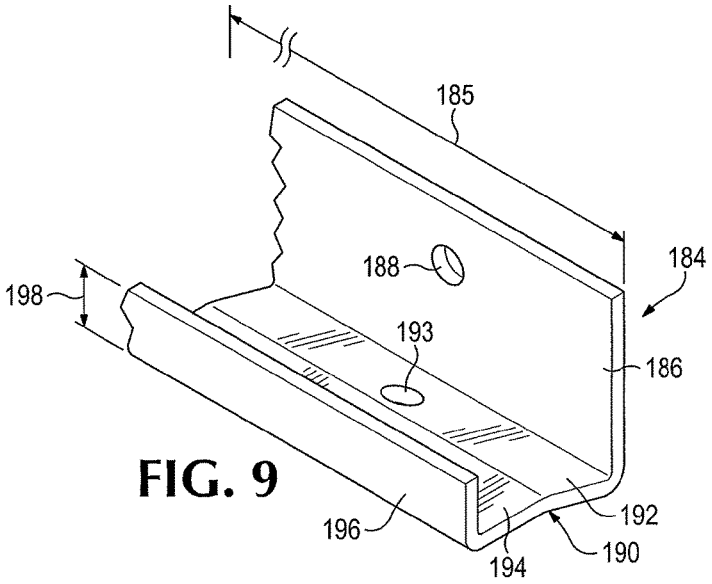
FIG. 9 is a foreshortened isometric view of an elongate support member for use in connection with the rain screen siding system shown in FIGS. 1-4.
Figure 10:
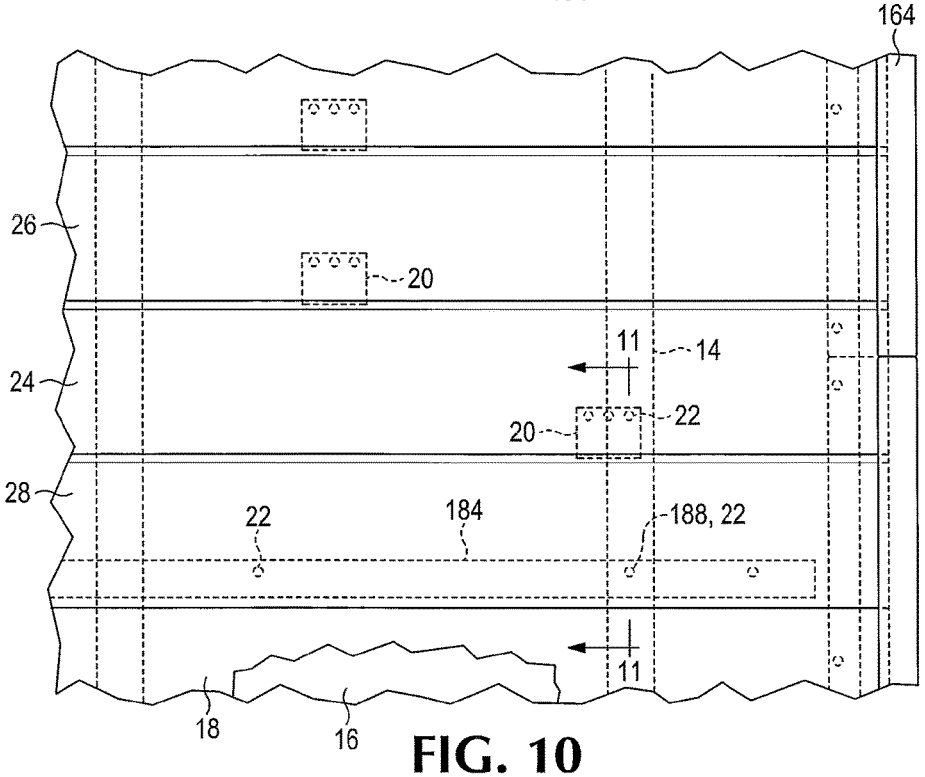
FIG. 10 is a view similar to that of FIG. 1, showing a rain screen siding structure including the support member shown in FIG. 9.
Figure 11:
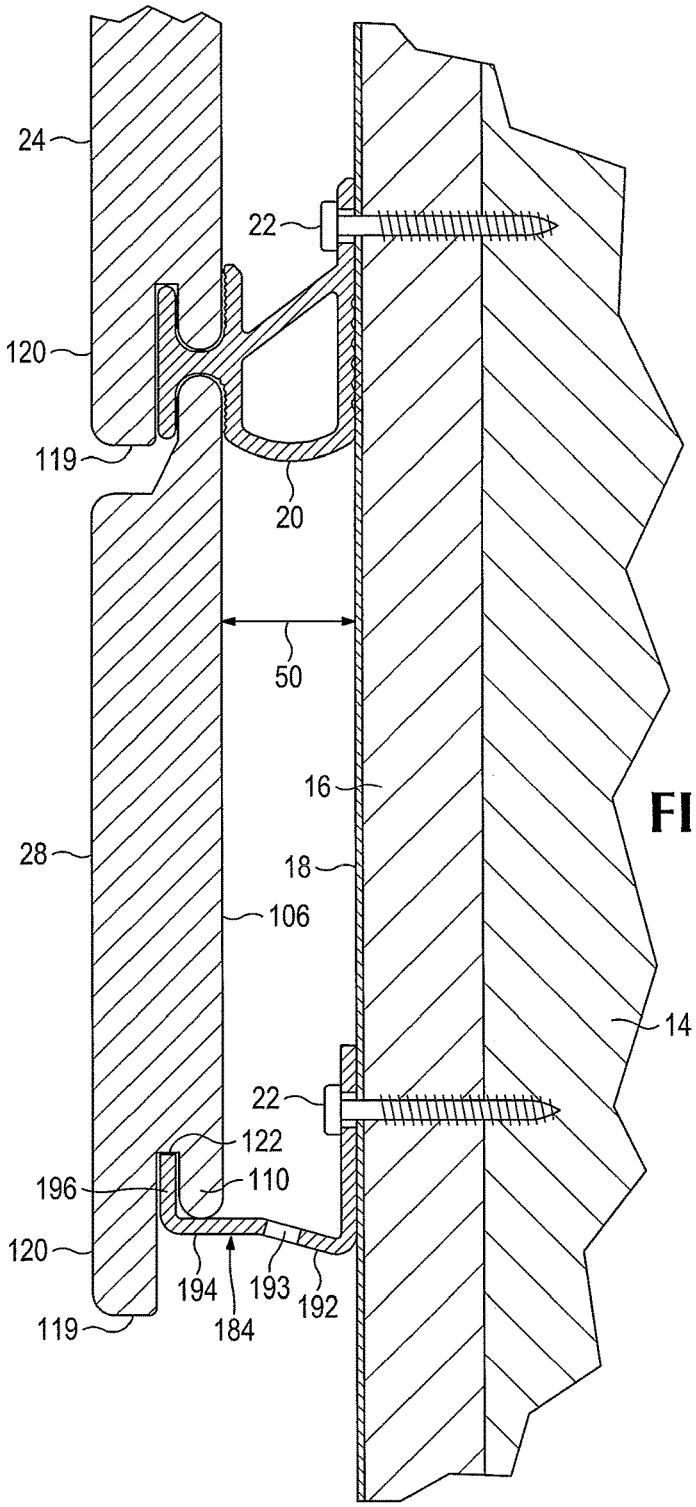
FIG. 11 is a sectional view, taken along line 11-11 of FIG. 10, showing a portion of a wall of a building including the rain screen siding structure shown in FIG. 10.

Referring to FIGS. 9, 10, and 11, a starter rail, or bottom support member 184, shown foreshortened in FIG. 9, may be used to support the lowest siding board 28 where siding boards 24, 26, etc., are mounted in a horizontal orientation, as shown in FIGS. 1 and 10. The starter rail 184 may be provided in desired lengths, such as 8 feet in length 185, and may be manufactured, for example, of sheet metal, such as sheet aluminum having a thickness of, for example, 0.09 inch, bent along parallel lines to a shape such as that illustrated in FIGS. 9 and 11. The shape includes a mounting base portion 186, to lie along the surface of a building wall, and which defines a plurality of mounting screw holes 188 spaced apart along the length of the starter rail 184. A generally horizontal standoff portion 190 extends outward from the mounting base portion 186, with an inner portion 192 optionally being oriented at a smaller angle, such as 75 degrees, to the mounting base portion 186, to define a moisture collection trough adjacent the vertical mounting base portion 186. Drain holes 193 may be spaced apart along the standoff portion 190, preferably in the inner portion 192. An outer part 194 may be oriented horizontally, at right angles to the generally vertical mounting base portion 186. A generally vertical supporting member or lip portion 196 extends upwardly from the outer part 194, parallel with the generally vertical mounting base portion 186, and with a height 198, of, for example, 0.45 inch, to correspond with the depth of a groove 122 defined by the lower margin of a siding board 24, between the lower tongue 110 and the skirt 120. This permits the lower tongue 110 to rest on the generally horizontal outer part 194 of the rail 184, as shown in FIG. 11 while the lip 196 prevents the lower margin of the siding board 24 from moving away from or closer to the sheathing layer 16 and weather barrier underlayment 18 of a wall. It will be understood that instead of being made of bent sheet aluminum, the support rail 184 may instead be of another metal or a composite material, or may be of extruded aluminum.

Figure 12:
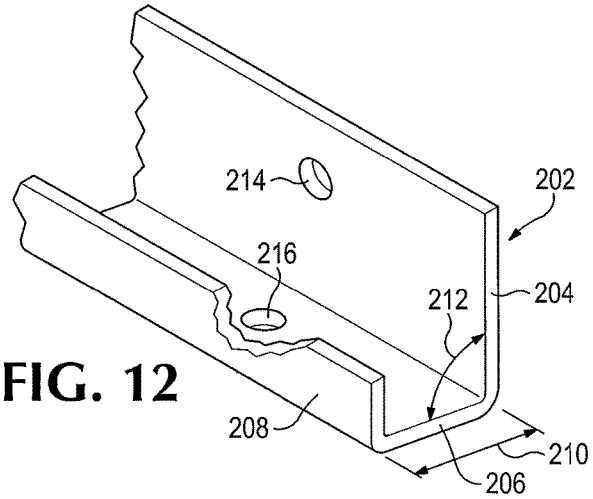
FIG. 12 is a foreshortened and partially cutaway isometric view of an elongate support member for use with a rain screen siding structure according to the disclosures herein.

The rail 184 may be mounted on a wall to which the rain screen siding described herein is to be attached, being leveled and secured by screws 22 to provide a convenient, straight, and level bottom edge so as to mount the rain screen siding more easily than can be accomplished by mounting individual mounting clips 20 separately. With the lowest siding board 28 placed onto the rail 184, mounting clips 20 can be installed at appropriately spaced-apart locations along the length of the siding board 28 to retain the upper margin of the siding board 28. Subsequent siding boards 24, 26, etc., can then be mounted in the fashion described above and illustrated in FIGS. 1 and 2.

Where it is desired to install a rain screen wall of the type described herein with the siding boards 24, 26, etc., with their lengths oriented vertically, as shown in FIGS. 13 and 14, a bottom support rail member 202 as shown in FIG. 12 may be used.

Similar to the support rail 184, the bottom support member, or starter rail, 202 has a generally vertical mounting base portion 204, a generally horizontal standoff portion 206, and a generally vertical supporting member or lip 208 spaced horizontally apart from the mounting base portion 204 by a standoff distance 210. The standoff portion 206 may be oriented at an angle 212 somewhat less than 90 degrees to the mounting base portion 204, in order to act as a collection trough for moisture. Mounting screw holes 214 may be provided in the mounting base portion 204 and drain holes 216 may be provided at spaced-apart locations along the length of the support rail 202 in the standoff portion 206.

In attaching a rain screen siding system to a building wall according to the present disclosure, a bottom support member 202 may be attached to the sheathing 16 over the weather barrier underlayment 18, as shown in FIG. 14, with mounting clips 20 arranged above the bottom support member 202 as shown in FIG. 14 to receive, locate, and secure a margin of a siding board extending vertically above the starter rail 202. One of the attachment clips 20 may be placed immediately above the mounting base portion 204 of the bottom support member 202, as shown in FIG. 14. The bottom end of each siding board 24, 26, 28, etc., may be shaped, as by a router, etc., to provide a rabbet 218 to receive the vertical support portion or lip 208. The support portion or vertical lip 208 then supports the vertical siding boards 24, 26, etc., while the mounting clips 20 keep the siding boards 24, 26, etc. located at the correct standoff distance 50 from the sheathing layer 16, preventing the bottom ends of the siding boards from moving apart from the sheathing layer 16 and being able to fall down outboard of the vertical support lip 208. Once a vertical siding board 28 has been placed additional mounting clips 20 are mounted against it, and a subsequent vertically-oriented siding board 24 may be installed sequentially, as will be understood. In addition to vertical installation of siding boards 28, 24, 26, etc., steep diagonal installation may be accomplished similarly, using a bottom support member 202, with individual siding boards 24, 26, etc., oriented more nearly vertical than the diagonal orientation illustrated in FIG. 8.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A rain screen siding system, comprising:

(a) a plurality of mounting clips of unitary construction;

(b) a plurality of siding boards supported on the mounting clips, wherein each siding board has a width and includes:

(i) an inner face;

(ii) an outer face;

(iii) a first tongue extending along the siding board adjacent a first margin of the board;

(iv) a parallel, oppositely directed second tongue extending along the siding board adjacent a second margin of the board, the first and second tongues respectively defining opposite longitudinally extending margins of the inner face; *and*

(v) a skirt portion including a marginal portion of the outer face located along the second margin of the siding board and spaced outwardly apart from and extending beyond a margin of the second tongue;

(c) and wherein each of the mounting clips includes:

(i) a planar mounting base having an outer face;

(ii) a standoff structure attached to the mounting base and extending outwardly therefrom;

(iii) a first pair of inner and outer channel wall members defining a first, upwardly-open, channel;

(iv) a second pair of inner and outer channel wall members defining a second, oppositely directed, downwardly-open channel; and (v) the standoff structure including an upper support member extending downward obliquely from the outer face of the mounting base and a lower support member extending generally horizontally from a lower margin of the mounting base to the inner channel wall of the second, downwardly-open channel, said standoff support structure interconnecting the channel wall members with the mounting base, and said inner channel wall members being parallel with and spaced apart from the mounting base[:]*;* and wherein d) a first tongue of a first one of the plurality of siding boards is engaged in the second, downwardly-open channel, and a second tongue of a second one of the plurality of siding boards is engaged in the first, upwardly-open, channel, with the skirt portion of the second one of the plurality of siding boards extending alongside and being spaced outwardly apart from the first tongue of the siding board engaged in the second, downwardly-open, channel, and the tongues of the first and second ones of the plurality of siding boards thus engaged in the mounting clip being spaced apart from one another and defining an open passageway between the adjacent first and second ones of the plurality of siding boards, through which an unobstructed flow of air is possible to ventilate an air space adjacent said inner face of each of said plurality of siding boards.

2. The rain screen siding system of claim 1 including an elongate rail including a support member engaging a groove defined in the second margin of one of the plurality of siding boards between said second tongue and said skirt portion thereof.

3. The rain screen siding system of claim 1 wherein said siding boards are installed in a non-horizontal orientation, the system including an elongate rail including a support member engaging a lower end of each of said plurality of siding boards.

4. The rain screen siding system of claim 1 wherein the outer channel wall members of said first and second channels of at least one of said plurality of mounting clips define a substantially planar outer face of said [siding attachment] *mounting* clip.

5. The rain screen siding system of claim 1 wherein all of said inner and outer channel wall members of at least one of said plurality of mounting clips are parallel with said planar mounting base thereof.

6. The rain screen siding system of claim 1 wherein said outer channel [walls] *wall members* of at least one of said plurality of mounting clips are coplanar.

7. The rain screen siding system of claim 1 wherein a plurality of drainage grooves are defined in [a rear side] *an inner face* of said planar mounting base of at least one of said plurality of mounting clips.

8. The rain screen siding system of claim 1 wherein an interior surface of at least one of said outer and inner channel wall members of each of said first and second channels of at least one of said plurality of mounting clips defines a plurality of drainage grooves.

9. The rain screen siding system of claim 1 wherein said upper support member of at least one of said plurality of [attachment] *mounting* clips extends to a central member located between the first, upwardly-open channel and the second, downwardly-open channel.

*10. A rain screen siding system, comprising:*

*(a) a plurality of mounting clips of unitary construction;*

*(b) a plurality of siding boards supported on the mounting clips, wherein each siding board has a width and includes:*

*(i) an inner face;*

*(ii) an outer face;*

*(iii) a first tongue extending along the siding board adjacent a first margin of the board;*

*(iv) a parallel, oppositely directed second tongue extending along the siding board adjacent a second margin of the board, the first and second tongues respectively defining opposite longitudinally extending margins of the inner face of the siding board; and*

*(v) a skirt portion including a marginal portion of the outer face located along the second margin of the siding board and spaced outwardly apart from and extending beyond a margin of the second tongue;*

*(c) and wherein each of the mounting clips includes:*

*(i) a mounting base having a planar inner face that is adapted to be mounted directly on a flat vertical surface of a building wall structure;*

*(ii) a standoff structure attached to the mounting base and extending outwardly therefrom;*

*(iii) a first pair of inner and outer channel wall members defining a first, upwardly-open, channel spaced outwardly apart from the inner face of the mounting base;*

*(iv) a second pair of inner and outer channel wall members defining a second, oppositely directed, downwardly-open channel spaced outwardly apart from the inner face of the mounting base and aligned with the first, upwardly-open channel;*

*(v) a central member located between the first channel and the second channel and interconnecting the respective inner and outer channel wall members of the first channel and interconnecting the respective inner and outer channel wall members of the second channel; and wherein*

*(vi) the standoff structure includes a support member extending outwardly from the mounting base to one of the central member or the respective inner channel wall member of at least one of the first, upwardly-open channel and the second, downwardly-open, channel, said support member interconnecting said one of the central member or the respective inner channel wall member of the at least one of the first channel and the second channel with the mounting base, and said one of the central member or the respective inner channel wall member of the at least one of the first channel and the second channel being spaced apart from the inner face of the mounting base; and wherein*

*(d) the first tongue of a first one of the plurality of siding boards is engaged in the second, downwardly-open, channel, and the first margin thereof is thereby spaced outwardly apart from the mounting base, and wherein the second tongue of a second one of the plurality of siding boards is engaged in the first, upwardly-open, channel, and the second margin of the second one of the plurality of siding boards is thereby spaced outwardly apart from the mounting base with the skirt portion of the second one of the plurality of siding boards extending alongside and being spaced outwardly apart from the first tongue of the one of the siding boards that is engaged in the second, downwardly-open, channel, the first and second ones of the plurality of siding boards thus being spaced outwardly apart from the inner face of the mounting base so as to create a continuous air space adjacent the inner faces of the plurality of siding boards, and wherein the respective first and second tongues of the first and second ones of the plurality of siding boards engaged in the channels of the mounting clip are thus spaced apart from the building wall structure by equal distances and spaced apart from one another and define an open passageway between the first and second ones of the plurality of siding boards, through which an unobstructed flow of air is possible to ventilate the continuous air space adjacent the inner faces of the plurality of siding boards.*

*11. The rain screen siding system of claim 10 including an elongate rail including a support member engaging a groove defined between said second tongue and said skirt portion of the second margin of one of the plurality of siding boards.*

*12. The rain screen siding system of claim 10 wherein said siding boards are installed in a non-horizontal orientation, the rain screen siding system including an elongated rail including a support member engaging a lower end of each of said plurality of siding boards.*

*13. The rain screen siding system of claim 10 wherein the mounting base of each of said mounting clips is planar and all of said inner and outer channel wall members of the first and second channels of at least one of said plurality of mounting clips are parallel with said mounting base thereof.*

*14. The rain screen siding system of claim 10 wherein a plurality of drainage grooves are defined in an inner face of said mounting base of at least one of said plurality of mounting clips.*

*15. The rain screen siding system of claim 10 wherein an interior surface of at least one of said outer and inner channel wall members of at least one of said first and second channels of at least one of said plurality of mounting clips defines a drainage groove.*

*16. The rain screen siding system of claim 10 wherein the inner channel wall member of the first, upwardly-open channel extends upward above and beyond the support member of the standoff structure.*

*17. A rain screen siding system, comprising:*

*(a) a plurality of mounting clips of unitary construction;*

*(b) a plurality of siding boards supported on the mounting clips, wherein each siding board has a width and includes:*

*(i) an inner face;*

*(ii) an outer face;*

*(iii) a first tongue extending along the siding board adjacent a first margin of the board;*

*(iv) a parallel, oppositely directed second tongue extending along the siding board adjacent a second margin of the board, the first and second tongues respectively defining opposite longitudinally extending margins of the inner face of the siding board; and*

*(v) a skirt portion including a marginal portion of the outer face located along the second margin of the siding board and spaced outwardly apart from and extending beyond a margin of the second tongue;*

*(c) and wherein each of the mounting clips includes:*

*(i) a mounting base adapted to be mounted to a flat surface of a building wall structure and having a planar inner face;*

*(ii) a standoff structure attached to the mounting base and extending outwardly therefrom;*

(iii) *a first pair of inner and outer channel wall members defining a first, upwardly-open, channel spaced outwardly apart from the inner face of the mounting base;*

(iv) *a second pair of inner and outer channel wall members defining a second, oppositely directed, downwardly-open channel spaced outwardly apart from the inner face of the mounting base;*

(v) *a central member located between the first channel and the second channel and interconnecting the respective inner and outer channel wall members of the first channel and interconnecting the respective inner and outer channel wall members of the second channel; and wherein*

(vi) *the standoff structure includes a support member extending outwardly from the mounting base to one of the central member or the respective inner channel wall member of at least one of the first, upwardly-open channel and the second, downwardly-open, channel, said support member interconnecting said one of the central member or the respective inner channel wall member of the at least one of the first channel and the second channel with the mounting base, and said one of the central member or the respective inner channel wall member of the at least one of the first channel and the second channel being spaced apart from the inner face of the mounting base; and wherein*

(d) *the respective outer channel wall members of said first and second channels of at least one of said plurality of mounting clips cooperatively define a substantially planar outer face of said at least one of said mounting clips; and wherein*

(e) *the first tongue of a first one of the plurality of siding boards is engaged in the second, downwardly-open, channel, and the first margin thereof is thereby spaced outwardly apart from the mounting base, and wherein the second tongue of a second one of the plurality of siding boards is engaged in the first, upwardly-open, channel, and the second margin of the second one of the plurality of siding boards is thereby spaced outwardly apart from the mounting base with the skirt portion of the second one of the plurality of siding boards extending alongside and being spaced outwardly apart from the first tongue of the one of the siding boards that is engaged in the second, downwardly-open, channel, the first and second ones of the plurality of siding boards thus being spaced outwardly apart from the inner face of the mounting base so as to create a continuous air space adjacent the inner faces of the plurality of siding boards, and wherein the respective tongues of the first and second ones of the plurality of siding boards engaged in the mounting clip are thus spaced apart from one another and define an open passageway between the first and second ones of the plurality of siding boards, through which an unobstructed flow of air is possible to ventilate the continuous air space adjacent the inner faces of the plurality of siding boards.*

*18. A rain screen siding system, comprising:*

(a) *a plurality of mounting clips of unitary construction;*

(b) *a plurality of siding boards supported on the mounting clips, wherein each siding board has a width and includes:*

(i) *an inner face;*

(ii) *an outer face;*

(iii) *a first tongue extending along the siding board adjacent a first margin of the board;*

(iv) *a parallel, oppositely directed second tongue extending along the siding board adjacent a second margin of the board, the first and second tongues respectively defining opposite longitudinally extending margins of the inner face of the siding board; and*

(v) *a skirt portion including a marginal portion of the outer face located along the second margin of the siding board and spaced outwardly apart from and extending beyond a margin of the second tongue;*

(c) *and wherein each of the mounting clips includes:*

(i) *a mounting base adapted to be mounted to a flat surface of a building wall structure and having a planar inner face;*

(ii) *a standoff structure attached to the mounting base and extending outwardly therefrom;*

(iii) *a first pair of inner and outer channel wall members defining a first, upwardly-open, channel spaced outwardly apart from the inner face of the mounting base;*

(iv) *a second pair of inner and outer channel wall members defining a second, oppositely directed, downwardly-open channel spaced outwardly apart from the inner face of the mounting base;*

(v) *a central member located between the first channel and the second channel and interconnecting the respective inner and outer channel wall members of the first channel and interconnecting the respective inner and outer channel wall members of the second channel; and wherein*

(vi) *the standoff structure includes a support member extending outwardly from the mounting base to one of the central member or the respective inner channel wall member of at least one of the first, upwardly-open channel and the second, downwardly-open, channel, said support member interconnecting said one of the central member or the respective inner channel wall member of the at least one of the first channel and the second channel with the mounting base, and said one of the central member or the respective inner channel wall member of the at least one of the first channel and the second channel being spaced apart from the inner face of the mounting base; and wherein*

(d) *said outer channel wall members of the first and second channels of at least one of said plurality of mounting clips are coplanar; and wherein*

(e) *the first tongue of a first one of the plurality of siding boards is engaged in the second, downwardly-open, channel, and the first margin thereof is thereby spaced outwardly apart from the mounting base, and wherein the second tongue of a second one of the plurality of siding boards is engaged in the first, upwardly-open, channel, and the second margin of the second one of the plurality of siding boards is thereby spaced outwardly apart from the mounting base with the skirt portion of the second one of the plurality of siding boards extending alongside and being spaced outwardly apart from the first tongue of the one of the siding boards that is engaged in the second, downwardly-open, channel, the first and second ones of the plurality of siding boards thus being spaced outwardly apart from the inner face of the mounting base so as to create a continuous air space adjacent the inner faces of the plurality of siding boards, and wherein the respective tongues of the first and second ones of the plurality of siding boards engaged in the mounting clip are thus spaced apart from one another and define an open passageway between the first and second ones of the plurality of siding boards, through which an unobstructed flow of*

*air is possible to ventilate the continuous air space adjacent the inner faces of the plurality of siding boards.*

*19. A rain screen siding system, comprising:*

*(a) a plurality of mounting clips of unitary construction;*

*(b) a plurality of siding boards supported on the mounting clips, wherein each siding board has a width and includes:*

*(i) an inner face;*

*(ii) an outer face;*

*(iii) a first tongue extending along the siding board adjacent a first margin of the board;*

*(iv) a parallel, oppositely directed second tongue extending along the siding board adjacent a second margin of the board, the first and second tongues thus extending along respective opposite longitudinally extending margins of the inner face; and*

*(v) a skirt portion including a marginal portion of the outer face located along the second margin of the siding board, the skirt portion being spaced outwardly apart from and extending beyond a margin of the second tongue, and the second margin of the siding board defining a groove extending along and between the skirt portion and the second tongue;*

*(c) and wherein each of the mounting clips includes:*

*(i) a mounting base having an outer face and an opposite planar inner face adapted to be mounted directly on a flat vertical surface of a building wall structure;*

*(ii) a standoff structure attached to the mounting base and extending outwardly from the outer face of the mounting base;*

*(iii) an upwardly-directed member supported by the standoff structure;*

*(iv) a pair of inner and outer channel wall members supported by the standoff structure and defining a downwardly-open channel; and wherein*

*(v) the standoff structure includes a support member extending from the outer face of the mounting base to one of the upwardly-directed member or the inner channel wall member of the downwardly-open channel, said support member interconnecting the one of the upwardly-directed member or the inner channel wall member with the mounting base, and said upwardly-directed member and said outer channel wall member of the downwardly-open channel being spaced apart from the inner face of the mounting base by equal distances; and wherein*

*(d) the first tongue of a first one of the plurality of siding boards is engaged comfortably, with some space to accommodate some swelling, in the downwardly-open channel, and the upwardly-directed member of the mounting clip is located in the groove defined between the skirt and the second tongue of a second one of the plurality of siding boards, with the skirt portion of the second one of the plurality of siding boards extending alongside and being spaced outwardly apart from the first tongue of the first one of the plurality of siding boards that is engaged in the downwardly-open channel, the siding boards thus being spaced outwardly apart from the inner face of the mounting base so as to create a continuous air space adjacent the inner faces of the plurality of siding boards, and wherein the first and second tongues of the first and second ones of the plurality of siding boards are thus spaced apart from the inner face of the mounting base by equal distances and spaced apart from one another and define an open passageway between the first and second ones of the plurality of siding boards, through which an unobstructed flow of air is possible to ventilate the continuous air space adjacent the inner faces of the plurality of siding boards.*

*20. The rain screen siding system of claim 19 including an elongate rail including a support member engaging the groove defined in the second margin of one of the plurality of siding boards between said second tongue and said skirt portion thereof.*

*21. The rain screen siding system of claim 19 wherein said siding boards are installed in a non-horizontal orientation, the system including an elongate rail including a support member engaging a lower end of each of said plurality of siding boards.*

*22. The rain screen siding system of claim 19 wherein a plurality of drainage grooves are defined in an inner face of said mounting base of at least one of said plurality of mounting clips.*

*23. The rain screen siding system of claim 19 wherein each of the mounting clips further includes an inner channel wall located between the upwardly-directed member and the mounting base, supported by the standoff structure and extending upward above and beyond the support member of the standoff structure.*

*24. A rain screen siding system, comprising:*

*(a) a plurality of mounting clips of unitary construction;*

*(b) a plurality of siding boards supported on the mounting clips, wherein each siding board has a width and includes:*

*(i) an inner face;*

*(ii) an outer face;*

*(iii) a first tongue extending along the siding board adjacent a first margin of the board;*

*(iv) a parallel, oppositely directed second tongue extending along the siding board adjacent a second margin of the board, the first and second tongues respectively defining opposite longitudinally extending margins of the inner face; and*

*(v) a skirt portion including a marginal portion of the outer face located along the second margin of the siding board, the skirt portion being spaced outwardly apart from and extending beyond a margin of the second tongue, and the second margin of the siding board defining a groove extending along and between the skirt portion and the second tongue;*

*(c) and wherein each of the mounting clips includes:*

*(i) a mounting base having an outer face and an opposite planar inner face adapted to be mounted on a flat surface of a building wall structure;*

*(ii) a standoff structure attached to the mounting base and extending outwardly from the outer face of the mounting base;*

*(iii) an upwardly-directed member supported by the standoff structure;*

*(iv) a pair of inner and outer channel wall members supported by the standoff structure and defining a downwardly-open channel; and wherein*

*(v) the standoff structure includes a support member extending from the outer face of the mounting base to one of the upwardly-directed member or the inner channel wall member of the downwardly-open channel, said support member interconnecting the one of the upwardly-directed member or the inner channel wall member with the mounting base, and said upwardly-directed member and said inner channel*

*wall member of the downwardly-open channel being spaced apart from the mounting base; and wherein*

(*d*) *the upwardly-directed member and the outer channel wall member of said downwardly-open channel of at least one of said plurality of mounting clips cooperatively define a planar outer face of said mounting clip; and wherein*

(*e*) *the first tongue of a first one of the plurality of siding boards is engaged in the downwardly-open channel, and the upwardly-directed member of the mounting clip is located in the groove defined between the skirt and the second tongue of a second one of the plurality of siding boards, with the skirt portion of the second one of the plurality of siding boards extending alongside and being spaced outwardly apart from the first tongue of the first one of the plurality of siding boards that is engaged in the downwardly-open channel, the siding boards thus being spaced outwardly apart from the inner face of the mounting base so as to create a continuous air space adjacent the inner faces of the plurality of siding boards, and wherein the first and second tongues of the first and second ones of the plurality of siding boards are thus spaced apart from one another and define an open passageway between the first and second ones of the plurality of siding boards, through which an unobstructed flow of air is possible to ventilate the continuous air space adjacent the inner faces of the plurality of siding boards.*

*25. A rain screen siding system, comprising:*

(*a*) *a plurality of mounting clips of unitary construction;*

(*b*) *a plurality of siding boards supported on the mounting clips, wherein each siding board has a width and includes:*

(*i*) *an inner face;*

(*ii*) *an outer face;*

(*iii*) *a first tongue extending along the siding board adjacent a first margin of the board;*

(*iv*) *a parallel, oppositely directed second tongue extending along the siding board adjacent a second margin of the board, the first and second tongues respectively defining opposite longitudinally extending margins of the inner face; and*

(*v*) *a skirt portion including a marginal portion of the outer face located along the second margin of the siding board, the skirt portion being spaced outwardly apart from and extending beyond a margin of the second tongue, and the second margin of the siding board defining a groove extending along and between the skirt portion and the second tongue;*

(*c*) *and wherein each of the mounting clips includes:*

(*i*) *a mounting base having an outer face and an opposite planar inner face adapted to be mounted on a flat surface of a building wall structure;*

(*ii*) *a standoff structure attached to the mounting base and extending outwardly from the outer face of the mounting base;*

(*iii*) *an upwardly-directed member supported by the standoff structure;*

(*iv*) *a pair of inner and outer channel wall members supported by the standoff structure and defining a downwardly-open channel; and wherein*

(*v*) *the standoff structure includes a support member extending from the outer face of the mounting base to one of the upwardly-directed member or the inner channel wall member of the downwardly-open channel, said support member interconnecting the one of the upwardly-directed member or the inner channel wall member with the mounting base, and said upwardly-directed member and said inner channel wall member of the downwardly-open channel being spaced apart from the mounting base; and wherein*

(*d*) *said upwardly-extending member and said outer channel wall member of said downwardly-open channel of at least one of said plurality of mounting clips are coplanar; and wherein*

(*e*) *the first tongue of a first one of the plurality of siding boards is engaged in the downwardly-open channel, and the upwardly-directed member of the mounting clip is located in the groove defined between the skirt and the second tongue of a second one of the plurality of siding boards, with the skirt portion of the second one of the plurality of siding boards extending alongside and being spaced outwardly apart from the first tongue of the first one of the plurality of siding boards that is engaged in the downwardly-open channel, the siding boards thus being spaced outwardly apart from the inner face of the mounting base so as to create a continuous air space adjacent the inner faces of the plurality of siding boards, and wherein the first and second tongues of the first and second ones of the plurality of siding boards are thus spaced apart from one another and define an open passageway between the first and second ones of the plurality of siding boards, through which an unobstructed flow of air is possible to ventilate the continuous air space adjacent the inner faces of the plurality of siding boards.*

* * * * *